United States Patent [19]

Levy et al.

[11] Patent Number: 4,529,842
[45] Date of Patent: Jul. 16, 1985

[54] AUTOMATIC FAULT RECOVERY ARRANGEMENT

[75] Inventors: Jacqueline S. Levy, Lombard; Ranjana A. Medhekar, Woodridge; David F. Winchell, Glen Ellyn, all of Ill.

[73] Assignee: AT&T Bell Laboratories, Murray Hill, N.J.

[21] Appl. No.: 490,833

[22] Filed: May 2, 1983

[51] Int. Cl.³ .................... H04M 3/10; H04M 3/56; H04Q 1/22
[52] U.S. Cl. .................... 179/18 BC; 179/18 EE; 370/16; 370/62
[58] Field of Search ........... 179/18 BC, 18 EE, 27 G; 370/13, 14, 16, 62

[56] References Cited

U.S. PATENT DOCUMENTS 4,086,446  4/1978  Taylor .............................. 179/27 G
4,172,214  10/1979  McDonald et al. ....... 179/18 EE X
4,317,007  2/1982  Harrison ......................... 179/18 BC Primary Examiner—Thomas W. Brown
Attorney, Agent, or Firm—Charles H. Davis

[57] ABSTRACT

A conference arrangement is disclosed having a plurality of logical multiport bridges for conferencing customer stations. Equipment units common to the bridges can be selectively connected to a station controlling each bridge. Upon the detection of a faulty unit, the interaction between the controlling station and the bridge is halted while a new unit is substituted. Announcements prompt the controlling station to reactivate the transaction that was halted. If the controlling station is off the bridge when the fault is detected and substituted equipment is unavailable, the station is forced back on the bridge, until a new unit becomes available.

8 Claims, 6 Drawing Figures

MAIN PROCESSOR SYSTEM

TONE RECEIVER SYSTEM 138

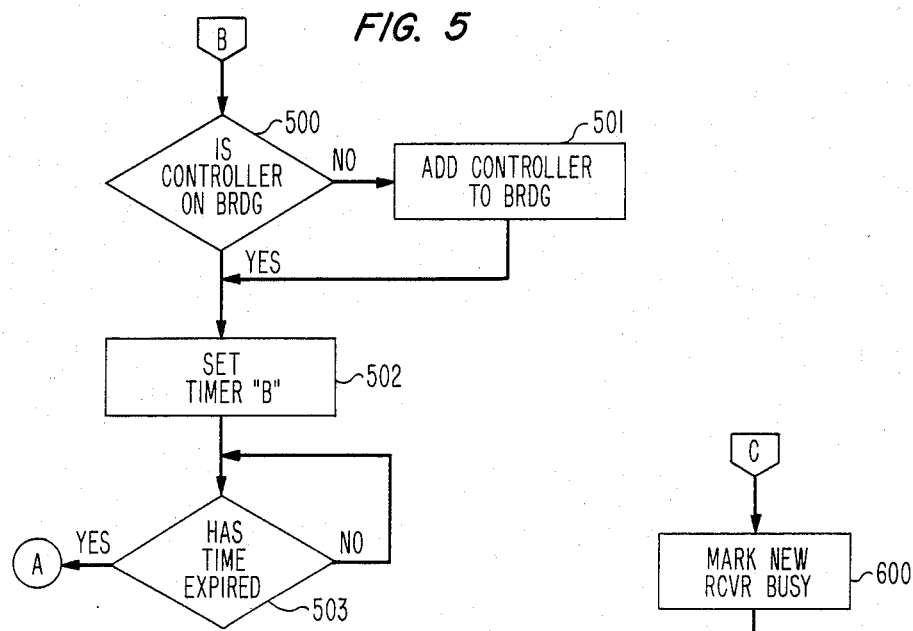
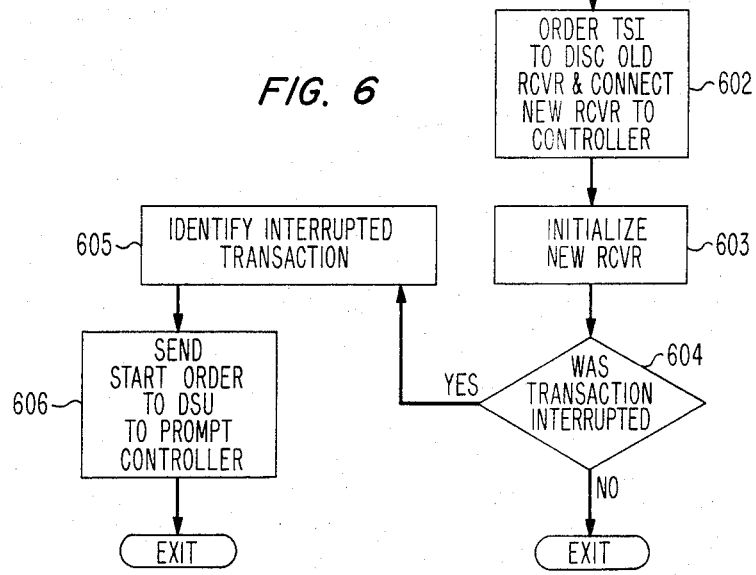

AUTOMATIC FAULT RECOVERY ARRANGEMENT

TECHNICAL FIELD

This invention relates to communication systems and particularly to fault recovery methods and apparatus.

In a more particular aspect this invention relates to a method and apparatus for detecting faulty equipment in a communication system, and for taking alternate corrective actions depending on the state of equipment when the fault is detected.

BACKGROUND OF THE INVENTION

Many communications systems include apparatus which monitors the call processing equipment to detect service irregularities. Thus, if faulty call processing equipment is detected, the equipment can be taken out of service, and new equipment substituted. Problems exist, however, when the units of equipment encounter faults during different stages of call processing.

For example, if a fault occurs before the unit of equipment is engaged on a call, the defective unit can be removed from service and a spare unit selected. Under these circumstances the customer using the system would be unaware of the equipment failure.

If, on the other hand, a unit of equipment fails during call processing, the call will be disrupted. In some instances the customer is unaware of the failure, except that the call is not completed while in other instances the call may time-out and a tone be returned to the customer.

While the use of tones for informing the customer of equipment trouble is wholly suitable for its intended purposes, these tones are also used to inform the customer of other conditions, such as all circuits busy and thus might confuse the customer as how to proceed when trouble is encountered.

SUMMARY OF THE INVENTION

The foregoing problem is solved, and a technical advance is achieved by method and apparatus for ascertaining whether a faulty unit is actively engaged in a call, automatically substituting a new unit for the faulty unit, and informing the customer who is inconvenienced by the faulty active unit as to the action the customer must take to continue with the call.

For illustrative purposes, the invention is disclosed in an automatic dial-up conference arrangement having a plurality of tone receivers which are individually coupled to conference lines to receive digits and control signals from the conference controller.

According to the invention, if a unit such as a tone receiver becomes faulty, the processor controlling the conference ascertains if the receiver has been assigned to a conference and if the receiver was active at the time that the failure occurred. If the receiver was not assigned to a conference, the receiver is removed from service and diagnostic tests are performed to analyze the nature of the fault. If the faulty receiver had been assigned to a conference, however, a new receiver would be substituted and coupled to the conference controller's line.

If the receiver became faulty when in an active state, such as during digit collection, the processor would cause an announcement to be transmitted to the customer advising the customer of the proper procedure for continuing with the conference.

In accordance with another feature of the invention, when there are no spare units of equipment available to replace the faulty unit, the call is returned to a stable state, whereby the customers can function without the faulty unit.

For example, in the illustrative conference embodiment, the controller of the conference has the ability to leave the conference to perform other tasks such as summoning other conferees, etc. Should a fault occur in a tone receiver while the controller has left the conference, he is automatically reconnected to the conference and can continue conferring with the other members until a tone receiver becomes available for his or her use.

BRIEF DESCRIPTION OF THE DRAWING

FIG. 3 shows a block diagram of the tone receiver system of the network services complex and FIGS. 4-6 show a flow diagram of the overall operation of the system with respect to fault recovery.

GENERAL SYSTEM DESCRIPTION

Figure 1:
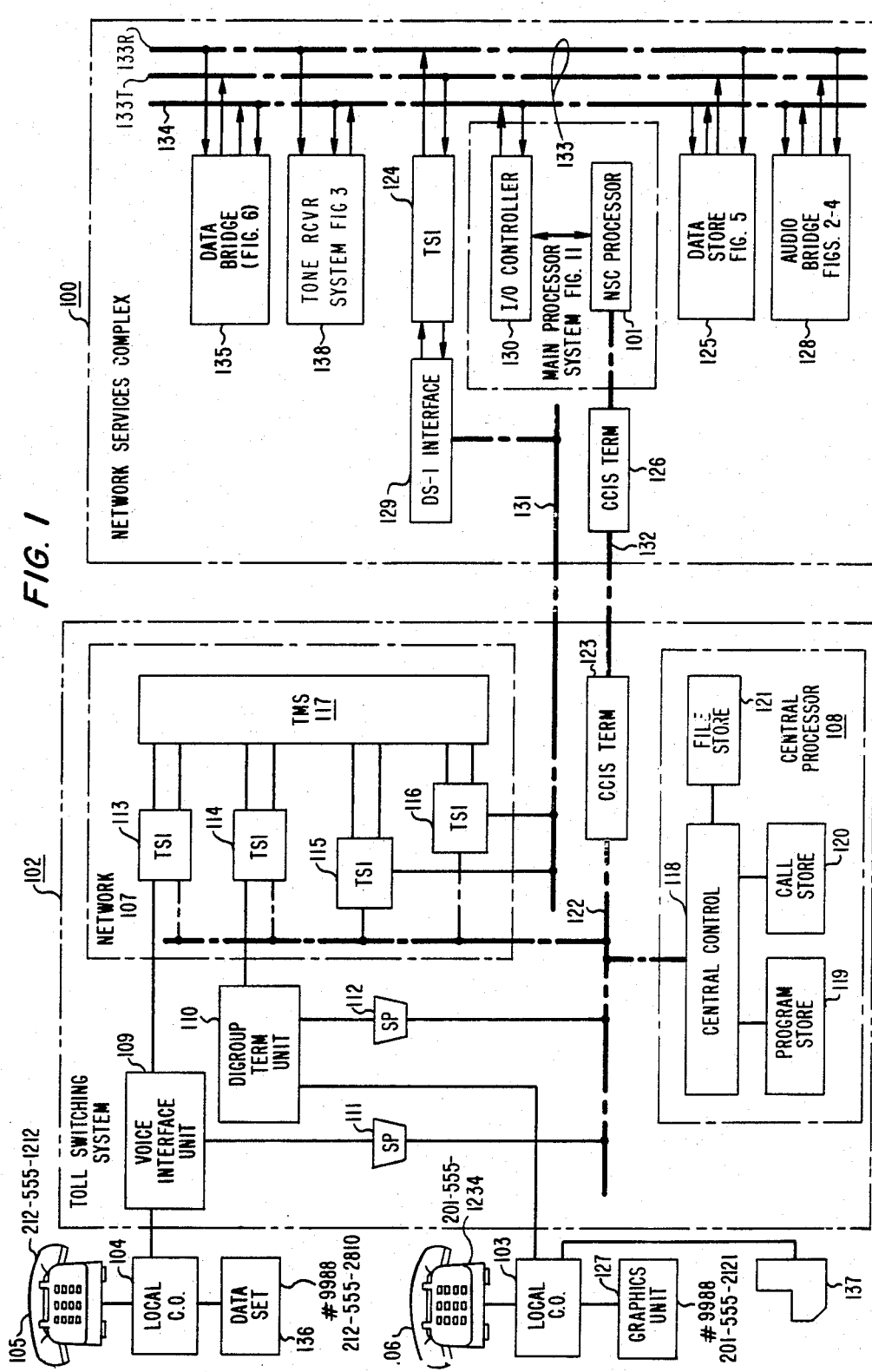
FIG. 1 shows a block diagram of a telephone network having a toll switching system equipped with a network services complex for providing conference services.

The general organization of a system employing the invention is illustrated in the block diagram of FIG. 1 which shows a typical communications network having a toll switching system 102 which serves local telephone central offices 103 and 104. Central offices 104 and 103 contain the switching apparatus for providing telephone service to customer stations 105 and 106, respectively and data service to data set 136 and graphics unit 127. Also connected to central office 103 is teleconference operator position 137. Connected to switching system 102 is a network services complex 100 for providing special services such as audio/data conferencing.

Network services complex 100 includes NSC processor 101, data store system 125, data bridge system 135, a tone receiver system 138, and other units. As will be described in more detail below, one of the functions of complex 100 is to provide audio/data conferencing with announcements and instructions to customers over the telephone network via the toll and local switching offices.

Toll switching system 102, as depicted in FIG. 1, is a typical electronic switching system, such as, the switching system described in detail in the *Bell System Technical Journal*, Vol. 56, No. 7, September 1978, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

Access to the switching network 107 is via serial pulse code modulation links each accommodating 120 voice channels. However, central offices 103 and 104 can be connected to toll switching system 102 via analog or digital transmission facilities.

The majority of the logic, control, storage and translation functions required for the operation of the toll switching system are performed by central processor 108. A typical processor suitable for use in the illustrative toll switching system is described in the *Bell System Technical Journal,* Vol. 56, No. 2, February 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmissions paths using a common channel interoffice signaling system. A typical common channel interoffice signaling system is described in the *Bell System Technical Journal,* Vol. 57, No. 2. dated February 1978.

Coupled to the toll switching system is the network services complex 100 comprising a main processor system including NSC processor 101 and input/output controller 130, a data bridge system 135, an audio bridge system 128, terminal 126, DS-1 interface 129, time slot interchange 124, data store announcement system 125 and a tone receiver system 138. Network services complex 100 can include other units such as additional audio conferencing bridges, speech recognition systems, data processing units, etc.

The network services complex is disclosed in the U.S. Pat. No. 4,475,189 which issued on Oct. 2, 1984 to D. E. Herr, R. Metz, L. E. Suk, P. R. Wiley and D. F. Winchell, and the reader is directed to that disclosure for a more detailed description of the network services complex. In order to appreciate how the present invention is utilized in a system such as the network services complex, a brief overview of the complex and its various subsystems will be given herein, but it will be obvious to one skilled in the art that the present invention is equally applicable to other systems without departing from the spirit and scope of the invention.

It is intended that network services complex 100 function with many different types of switching systems to provide several special services in addition to those mentioned above. As such, complex 100 has been designed to connect to a switching system via conventional interoffice trunks 131 and a CCIS type data link 132. The interoffice trunks 131 serving complex 100 are digital facilities similar to the trunks between toll office 102 and local office 103 as described above, and the data link 132 and its terminals are similar to those described in the 1978 *Bell System Technical Journal* cited above. Although these terminals are referred to as CCIS terminals it is not essential that they be integrated in the CCIS signaling system used for call processing in the network, and the term CCIS is only used herein to describe one type of terminal suitable for use in the arrangement.

The network services complex is modularly designed to allow for various service units to be added. All units are interconnected over a data bus 133 and a control bus 134. The control bus is used by the NSC processor 101 to communicate control, status and error information with the various units in the complex. Data bus 133 consists of a transmit bus and a receive bus and each bus is a 256 time slot, time-multiplexed PCM data bus.

Interface 129 connects the T1 trunks from toll switching system 102 to time slot interchange unit 124 which under the direction of processor 101 switches any time slot in the receive T1 bus or the transmit portion of the data bus 133 with any time slot on the T1 transmit bus or the receive portion of data bus 133. Thus, the interface 129, time slot interchange 124, and bus 133 provide the path for the exchange of voice, data, announcements and inband signaling between the toll switching system 102 and units of the network services complex.

The network services complex 100 is controlled by NSC processor 101 which performs or initiates all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For purposes of illustration, let it be assumed that the complex is equipped for dial-up audio/data conferencing with voice prompting. Accordingly, the complex comprises an audio bridge system 128 which is used for combining the digital voice samples of speakers on a conference for distribution to other participants of the conference. A typical audio conference arrangement suitable for use in the network services complex and the present invention is disclosed in more detail in the aforementioned D. E. Herr et al. patent and a description of that arrangement need not be reiterated herein for a complete understanding of the present invention.

Data bridge system 135, on the other hand, receives data from each conferee's data terminal and distributes the data to the other conferees at the correct speed, in the proper format, etc. The term "data" when used with respect to information transmitted by a customer, is meant to include digital representations of video signals, facsimile signals from devices such as electronic chalk boards, etc., which is separate from the voice and tone signals transmitted by the customer. A typical data bridge system suitable for use in the present arrangement is disclosed in the aforementioned patent of D. E. Herr et al. and U.S. Pat. No. 4,479,195, which issued on Oct. 23, 1984 to D. E. Herr, R. Metz and L. A. Russell. The reader is directed to these patents for a more complete disclosure of a data bridge which need not be reiterated herein for a full understanding of the present invention.

Network services complex 100 also includes a data store system 125 for furnishing tones and announcements to instruct the customers in the use of the special services. A typical data store system is described in more detail in a copending application of T. W. Anderson, R. J. Milczarek and C. H. Peters, Ser. No. 380,511 filed May 21, 1982 and need not be disclosed herein in further detail. Tone receiver system 138 performs the digit reception function for the network services complex and will be described in more detail below.

DS-1 interface 129 in this embodiment provides an interface for up to five T1 trunks (120 channels or time slots) which terminate on time slot interchange unit 124. The time slot interchange unit in turn, functions to switch these circuits with 256 time slots on time multiplexed data bus 133 to interconnect the channels with the various service units in network services complex.

Thus, voice, data, and signaling information incoming over the toll telephone network from a conferee is forwarded via interface 129, and time slot interchange 124 to the audio and data bridges for conferencing or to a tone receiver for digit detection and collection while announcements and tones from data store system 125 and conference data from the bridges are transmitted back via the time slot interchange over the toll network to the conferees.

The control interface between the network services complex system and the toll switching system 102 is via a main processor system including NSC processor 101, input/output controller 130, and terminal 126. It is via this path that orders are exchanged between the network services complex and the toll switching system.

Figure 2:
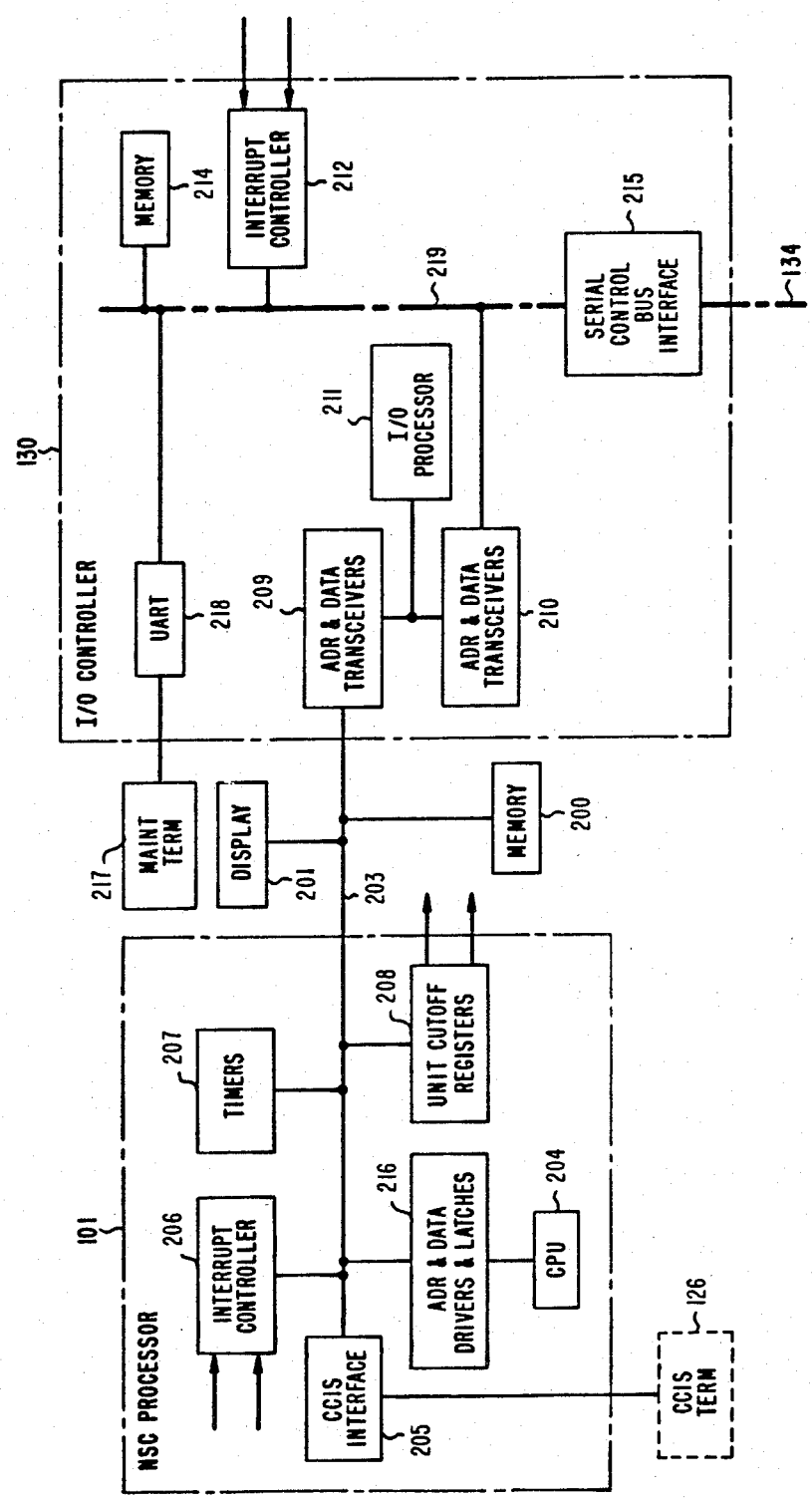
FIG. 2 shows a block diagram of the main processor system of the network services complex.

The main processor system for the network services complex is shown in more detail in FIG. 2. The main processor system comprises NSC processor 101, memory 200, input/output controller 130, and display 201 which are interconnected over system bus 203. The main processor system is a distributed processor which is responsible for all call processing, maintenance, fault recovery, certain diagnostics and audits for the network services complex as a whole. The main processor system also keeps track of all system resources such as what ports are assigned to a particular conference, the status of all ports and receivers, the identification of available announcements, etc.

Communication with the toll switching system 102 is via terminal 126 which accesses processor 101 via a direct memory access channel, and processor 101 distributes orders to and receives replies from the peripheral service units (such as the data bridge, the audio bridge, etc.) via input/output controller 130 which acts as a direct memory access controller for the processor. Using a shared area of memory 200, controller 130 transfers messages between the peripheral service units and processor 101.

The units within the main processor system communicate via system bus 203 in a master-slave relationship. Central processing unit (CPU) 204, I/O processor 211, and a memory refresh controller (not shown), act as masters with the other units acting as slaves. Contention between bus masters is resolved by a bus arbiter arrangement in a well-known manner.

The NSC processor 101 comprises CPU 204, interrupt controller 206, interface 205, timer 207, and unit cutoff registers 208.

Interrupt controller 206 responds to signals from equipment such as timer 207 and controller 130. It will be noted that CCIS interface 205 resides on the system bus to permit any master on the bus to access a random access memory (RAM) which resides in the terminal 126.

As mentioned above, the serial control bus 134 interconnects the main processor system with the peripheral service units for control information and time multiplexed data bus 133 interconnects the units for data flow. These units can be disabled and forced off the bus by unit cutoff registers 208 under the direction of CPU 204.

The input/output controller 130 acts as a direct memory controller for memory 200 and all service unit operations. In addition, it permits maintenance personnel to access the system via a maintenance terminal 217. I/O processor 211 accesses its own resident bus 219 via address and data transceivers 210, and it accesses the system bus 203 via address and data transceivers 209.

I/O processor 211 has its own memory 214 for program storage and its own interrupt controller 212. It is via interrupt controller 212 that the peripheral units such as the tone receiver system audio bridge, etc., gain access to the main processor system of the network services complex.

All communication of the control information between the main processor system and the other units of the complex is via serial control bus interface 215 and control bus 134. The main processor system units acts as a master on the control bus with the audio bridge system, data bridge system, data store system, tone receiver system, time slot interchange unit, etc. acting as slaves. Messages from the main processor system are formatted with a destination address of the peripheral system to which the message is directed, followed by an operation code which specifies the function of the message and a data field containing the contents of the message. If a peripheral unit such as the tone receiver system wishes to utilize the control bus 134, it signals over a dedicated interrupt lead to interrupt controller 212, and the main processor system can grant control of the bus with the next message it sends over the bus.

The tone receiver system 138 provides for dual-tone multifrequency digit reception for the network services complex.

Figure 3:
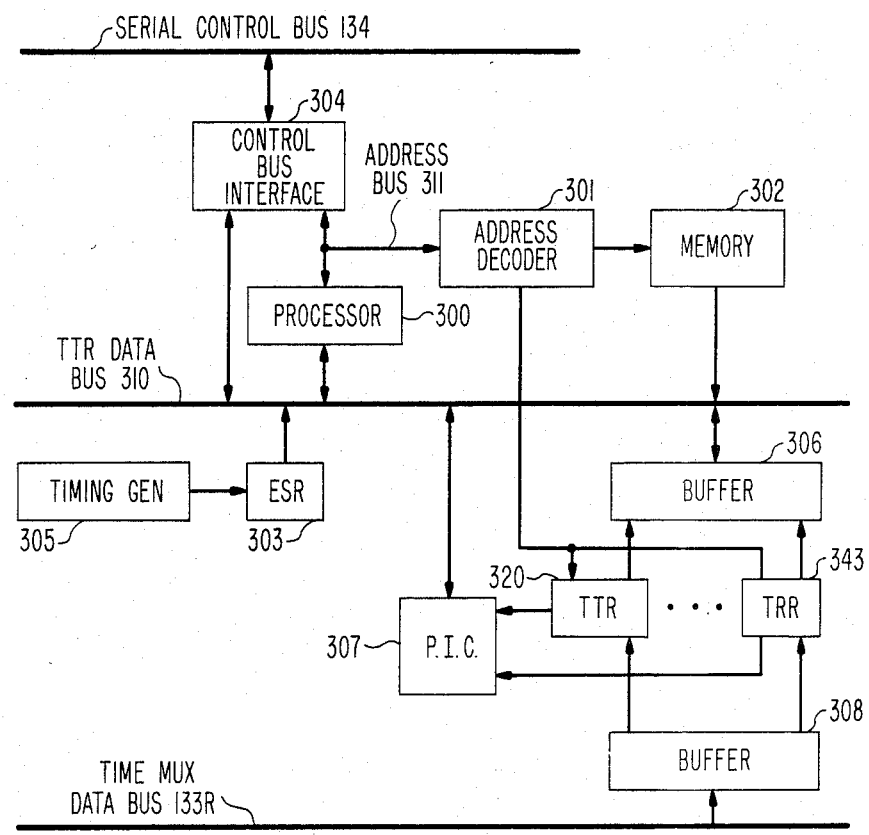

As shown in FIG. 3, the tone receiver system comprises a plurality of tone detectors 320–343, a processor 300, address decoder 301, memory 302, bus interfaces 304 and 308 and other units of equipment.

Processor 300 is the main processor for the tone receiver system 138, and it decodes all orders received from NSC processor 101 over the serial control bus 134 via interface 304. In turn, processor 300 reports back to the NSC processor 101 digits that had been received by the tone receivers 320–343, error reports etc. Processor 300 is also coupled to the NSC processor 101 via a single interrupt lead which allows the tone receiver processor to interrupt the NSC processor to report digits received at designated intervals and to report those errors that occur in the tone receiver system.

A plurality of tone receivers 320–343 are provided in the tone receiver system 138. Each of the tone receivers is assigned a time slot on time multiplexed data bus 133R to receive digits from the telephone network in an 8-bit serial format. These digits are received from customer stations via time slot interchange 124 and the receive portion of time multiplexed data bus 133R and buffer 308. Each tone receiver comprises a digital signal processor which receives, detects, and reports to processor 300 the digits it receives. When a digit is received, it is checked for validity within the tone receiver (320–343) and an interrupt is sent to processor 300 via priority interrupt controller 307. When processor 300 acknowledges the interrupt, it addresses the correct receiver in the group 320–343 via address decoder 301, and reads the contents of the receiver. Processor 300 then stores the digit along with the identity of the receiver in memory 302. In addition to checking the validity of the digit, the digital signal processor in each tone receiver assures that a digit is present for a minimum interval to qualify as a valid digit.

A typical digital signal processor suitable for use in this invention is described in the *Bell System Technical Journal*, Vol. 6, No. 7, Part 2, September 1981.

In addition to providing digit storage capacity for tone receiver 320–343, memory 302 contains all operation and diagnostic programs, scratch pad registers, etc., for processor 300.

As noted above, processor 300 can transmit an interrupt signal to NSC processor 101 at periodic intervals to report errors and the digits received and stored in memory 302. Since memory 302 provides ample storage for the digits received by each tone receiver, the tone receiver system can be polled at intervals which are determined by processor 101 through the use of a program timer in the tone receiver system. This permits the NSC processor 101 to process calls more efficiently without having to constantly poll the tone receiver unit for each individual digit received.

SEQUENCE OF OPERATIONS—AUDIO/DATA CONFERENCE

The overall operation of the arrangement can best be illustrated by describing the sequence of events that takes place when a customer originates a conference call.

The conference originator begins by dialing into his/her local office a conference service access code of 10 or 11 digits, such as 0+700+456+X000. The first digit might be used to route the call through a switching facility which enables the automatic identification of the calling customer for billing purposes. The next three digits provide a uniform code which identifies all special services such as those to be provided by the network services complex on a nationwide basis so that all customers within a wide geographic area utilize the same code. In the example being described, the digits 700 are used. The fifth through seventh digits (such as, "456") identify all teleconferencing services and the last four digits indicate the particular conference services, such as audio-only, audio/data, the size of the conference required, etc. For purposes of illustration, let it be assumed that the customer wishes to originate an audio/data conference.

The call is routed via the telephone network in a conventional manner to a toll switching system 102 shown in FIG. 1. Switching system 102 selects an idle trunk in the T1 link 131 and sends an initial address message (IAM) over link 132 to the network services complex indicating that conference resources are desired.

In response to the initial address message, network services complex processor 101 ascertains if it has sufficient conference resources to provide the service. It does this by examining tables in RAM 200 (FIG. 2) which list all of the available facilities along with their busy/idle status.

In the system being described, the conference can be controlled from a customer station through the use of a dual-tone multifrequency keypad at the station. Thus, the network services complex processor 101 ascertains if a tone receiver is available for connection to the originator.

Processor 101 then orders terminal 126 to send a message to the host switching system 102 requesting identification of the conference originator. This is an indication to the host that the conference call will be accepted by the network services complex, and the call can proceed in the manner described in the aforementioned D. E. Herr et al. U.S. Pat. No. 4,475,189.

In particular, NSC processor 101 selects an idle tone receiver such as 320 from its memory which lists all conference resources, assigns a number to the conference and allocates the selected tone receiver to the conference. Also, NSC processor 101 sends orders to the tone receiver system 138 to initialize the selected tone receiver. The initialization might include establishing the digit and interdigital timing intervals, the type of signal (i.e. dual-tone multifrequency or 2-out-6 multifrequency) etc.

An order is also sent to time slot interchange 124 to interconnect the tone receiver with a T1 line serving the customer who originated the conference.

When a conference is originated by the customer directly dialing the conference facility, the originator is designated as the conference controller. Thus, certain announcements will be played to the controller and the tone receiver will be coupled to the controller's incoming T1 line to receive digits and control signals to operate the conference.

Accordingly, processor 101 also selects an idle announcement buffer in data store system 125. This buffer will be connected via TSI 124 to the conference originator to provide announcement prompts and tones for assisting the originator in establishing and controlling the conference.

As descrived in the above Herr et. al. U.S. Pat. No. 4,475,189, the originator/controller now proceeds to dial the directory numbers associated with the other conferees and data terminals to establish an audio conference for all audio stations that are dialed and a data conference for all data terminals that are dialed. As each audio conferee responds, the conferee is connected in a privacy mode with the controller and the controller can add the conferee to the bridge by dialing the digit two.

When all conferees have been summoned, the controller can join the conference and the conference assumes a stable state.

In the stable state, the tone receiver remains connected to the controller via time slot interchange 124 to monitor the controller's line should the controller wish to implement one of the features of the conference system by dialing a particular code.

When the controller wishes to actuate one of the features of the bridge, the controller disconnects from the bridge by depressing the pound (#) button on the station keypad. The tone transmitted by the actuation of this button is received by the tone receiver attached to the controller's line and is forwarded to processor 101. Processor 101 recognizes the pound (#) signal as the beginning of a transaction between the network services complex and the customer. Processor 101 then sends an order to time slot interchange 124 to disconnect the controller from the bridge so that the subsequent multifrequency tones transmitted by the controller are not heard by the other conferees on the bridge, and the controller can be prompted without interferring with the conference.

The term "transaction" as used herein, defines the interactive process between a customer and the network services complex. Many different transactions may be called upon during a conference. In addition to the ones noted above, a transaction would control the system when the conference is initially being set up to prompt the customer to dial the service entry number. Another transaction would be involved in dialing the first audio leg and a similar one would be involved in the setting up of a data leg.

Each transaction is identified in a table in the memory of processor 101, the table contains the lists of announcements to be played during a transaction, the type of signaling to be received from the customer, the number of errors the customer is allowed to make during the transaction, timing criteria, the number of digits to be collected, digit patterns, etc.

Since the processor 101 is busy serving the needs of many different conferences, a flag associated with the conference is set to indicate that a transaction is in progress for this particular conference. Also, the identity of the transaction is stored in the conference record. During each transaction, digits may be collected by the tone receiver serving the conference, and announcement prompts may be played to the controller to assist the controller in taking whatever action is necessary to implement a particular feature.

Once the transaction between the controller and the network services complex processor 101 is completed, such as, when the controller rejoins the conference and the conference is put in a stable state, the transaction flag is removed from the conference record.

Let it now be assumed that a conference has been established and all conferees, including the originator who is in control of the bridge, are added to the bridge so that the conference is marked in a stable state. Let it also be assumed that a tone receiver assigned to the conference develops a fault, and recognizing the fault processor 300 in the tone receiver system generates an error report which is transmitted to NSC processor 101.

It will be recalled from the prior description that the tone receiver system has built-in self-checking features which monitor the correct operation of the tone receiver system. For example, parity checks are performed on data received on the time multiplexed data bus, on data transferred within the tone receiver system, each time memory 302 is accessed, etc. Similarly, a cyclic redundancy check is performed on data received from processor 101 via control bus 134. These parity failures along with hardware failures, timeouts, etc., will cause an interrupt to occur within the tone receiver system. In response to the interrupt, tone receiver processor 300 generates an error report and sends a signal to NSC processor 101. Processor 101 then relinquishes control of the control bus 134 and the error report is transmitted over control bus 134. The error report will contain the identity of the tone receiver that is faulty and the nature of the fault.

Figure 4:
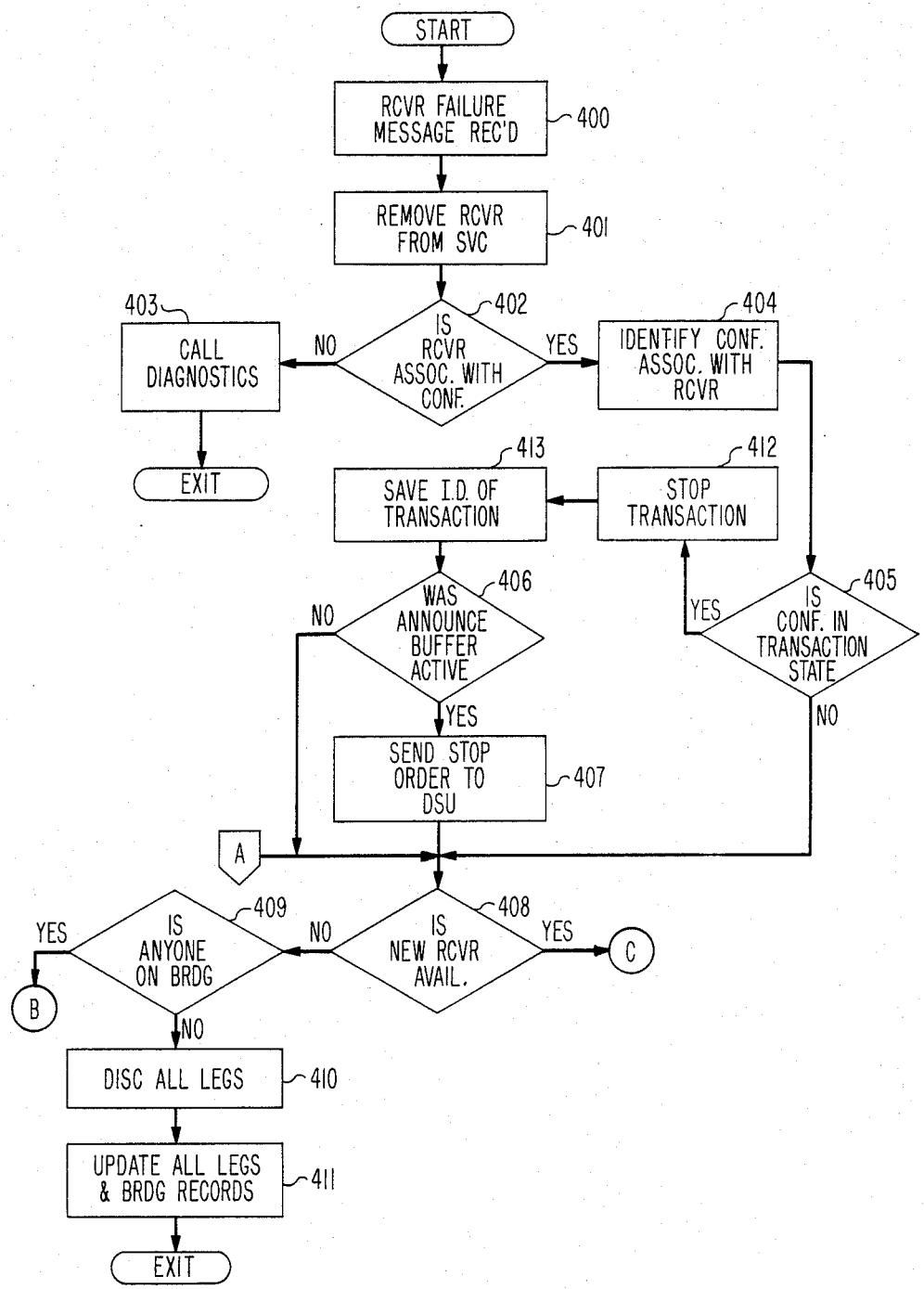

As shown in boxes 400 and 401 of FIG. 4, when NSC processor 101 receives an error report, it removes a defective receiver from service by marking the receiver out of service in the appropriate tables in memory. A check is also made by processor 101 to determine if the receiver had been assigned to a conference. If the receiver was not assigned to a conference, certain diagnostic programs are called (box 403) and a maintenance report is prepared if the tone receiver appears faulty.

If the receiver is associated with a conference, the "yes" branch of box 402 is executed and the conference is identified as shown in box 404.

Processor 101 now ascertains if the "transaction" flag is set for this conference by executing box 405. As noted above, during a transaction there is an exchange of information between the customer's station and the network services complex. The customer may be transmitting digits and control signals to the system and the system may be transmitting announcements to the customer. Should a receiver failure occur at this time, the signals transmitted by customers may be lost or distorted. On the other hand, other types of equipment failure may prevent the customer from receiving the appropriate announcement prompts leaving the customer helpless.

Returning now to the description of operation, if the receiver failed during a transaction as indicated by the execution of the "yes" branch of box 405, the transaction is stopped (box 412) and the identity of the transaction is saved (box 413) for use at a later time. Processor 101 determines at this time if the data announcement buffer was active on this conference. If the buffer was active, an order is sent to the data storage unit to stop the announcement as shown in box 407.

Processor 101 now determines whether or not an idle tone receiver is available by executing box 408 and whether anyone is on the audio bridge by executing box 409. If no tone receiver is available to replace the defective receiver and all the conferees have disconnected from the bridge, processor 101 executes boxes 410 and 411 to disconnect all legs and update the appropriate leg and bridge records in memory. The legs are disconnected by sending the appropriate disconnect orders to the time slot interchange 124 and to the audio bridge system 128.

It if is assumed that a receiver is not available but there are still conferees on the bridge, the "yes" branch of box 409 is executed and a determination is made as to whether or not the controller is on the bridge as shown in box 500 of FIG. 5. If the controller is off the bridge at this time, orders are sent to the time slot interchange and the audio bridge to add the controller to the bridge (box 501) so that the conference can continue even though the controller does not have access to a tone receiver at this time.

Processor 101 then executes box 502 to set timer B, and at the expiration of the time designated by timer B, processor 101 executes the "yes" branch of box 503 to ascertain if a receiver has now become idle.

Periodically, processor 101 will execute the above-described processes until a tone receiver becomes available from another conference or until the conference under consideration is abandoned by all the conferees disconnecting.

Let it be assumed that a tone receiver does become available and the "yes" branch of box 408 is executed. Processor 101 now marks the new tone receiver busy in memory and allocates the receiver to the conference being described (boxes 600 and 601). Orders are now sent by NSC processor 101 to disconnect the old tone receiver from the controller's T1 line and reconnect the controller to the newly selected tone receiver as shown in box 602.

The new receiver is initialized with the appropriate parameters such as digit timing, interdigital timing interval, type of tones, etc., as indicated in box 603.

The conference that was effected by the defective tone receiver has now been restored to full service, but processor 101 must ascertain whether the service irregularity occurred during a transaction which caused an inconvenience to the customer. If the unit failure did not occur during a transaction, the new unit is substituted and this portion of the program is exited by executing the "no" branch of box 604. Under these circumstances substitution of a new tone receiver is done without the customer being aware of any service irregularity. Had the tone receiver failed during a transaction, the "yes" branch of box 604 would be executed, and processor 101 would identify the transaction that was interrupted. Processor 101 then sends orders to data storage unit 125 to have the customer reprompted accordingly. Of course, depending on when the transaction was interrupted, the processor could reprompt the customer with the appropriate announcements to continue dialing from where the customer was interrupted or to re-enter all of the digits necessary to perform the control function.

In summary, a communication system has been disclosed wherein the detection of a faulty unit of equipment caused the substitution of another unit. If the fault occurs during an active call process which may be disrupted by the faulty unit, the process is stopped and the customer is prompted as to what action must be taken to continue the call processing after the faulty unit has been replaced.

It will be understood, of course, that the arrangement described in the foregoing is merely illustrative of the application of the principals of the present invention and numerous other arrangements may be utilized by those skilled in the art without departing from the spirit and scope of the invention.

What is claimed is:

1. A method for processing equipment unit failures in a communication system comprising the steps of:
   detecting a faulty equipment unit,
   ascertaining whether the faulty equipment unit was allocated to a customer engaged in a communication service,
   ascertaining whether a customer transaction utilizing said faulty equipment was interrupted,
   substituting a new equipment unit for the faulty unit, and
   advising the customer of the action to take to continue the service in the event the transaction was interrupted.

2. The invention defined in claim 1 wherein the steps of ascertaining whether a transaction was interrupted comprises the steps of identifying the transaction that was interrupted and storing the identity of the interrupted transaction in memory.

3. The invention defined in claim 1 further comprising the step of setting a flag in memory at the beginning of a customer transaction and resetting the flag at the end of said transaction and wherein the step of ascertaining whether a transaction was interrupted comprises the step of examining the flag upon detecting a faulty unit.

4. The invention defined in claims 1 or 2 wherein the step of advising the customer comprises the step of restarting the interrupted transaction.

5. The invention defined in claim 4 wherein the step of advising the customer comprises the step of transmitting a prerecorded announcement to said customer.

6. For use in a conference arrangement comprising a multiport conference bridge, means for selectively coupling customer stations to said ports for conferencing, and a plurality of equipment units each connectable to a controlling one of said stations for controlling said conference arrangement, a method for processing equipment unit failures comprising the steps of
   detecting a faulty equipment unit,
   ascertaining whether the faulty equipment unit was connected to a controlling station that was uncoupled from the bridge when the fault occurred,
   ascertaining if another equipment unit is available, and
   forcing the controlling station to be recoupled to the bridge in the event said other unit is unavailable.

7. For use in a conference system having a plurality of multiport conference bridges, means for selectively coupling customer stations to said ports to form individual conferences among the stations associated with each bridge, a plurality of equipment units common to said bridges and each unit being connectable to a controlling one of said stations for controlling the bridge associated with the connected station, a method for processing equipment unit failures comprising the steps of
   detecting a faulty equipment unit,
   identifying the conference bridge that the faulty unit was associated with,
   interrupting any transaction between the faulty unit and the controlling station associated with the identified bridge,
   substituting another equipment unit for connection to the controlling station, and
   announcing to the controlling station the action required by the controlling station to restart the transaction.

8. The invention defined in claim 7
   wherein the step of substituting another equipment unit comprises the step of ascertaining the availability of another equipment unit, coupling said other unit to said controlling station when said other unit is available and assuring that the controlling station is coupled to the bridge in the event said other unit is unavailable.

* * * * *